United States Patent [19]

Radmanovich

[11] Patent Number: 4,615,137
[45] Date of Patent: Oct. 7, 1986

[54] ENERGY EFFICIENT AERATED BAIT CONTAINER

[76] Inventor: Theodore J. Radmanovich, Rte. 2, Box 109A, Cohasset, Minn. 55721

[21] Appl. No.: 692,627

[22] Filed: Jan. 18, 1985

[51] Int. Cl.$^4$ .......................................... A01K 97/04
[52] U.S. Cl. .................................. 43/57; 261/121 M
[58] Field of Search .............................. 43/57, 56, 55; 261/121 M; 220/22

[56] References Cited

U.S. PATENT DOCUMENTS

| | | | |
|---|---|---|---|
| 2,639,906 | 5/1953 | Butler | 261/36 |
| 2,651,137 | 8/1953 | Sweet | 43/56 |
| 2,767,509 | 10/1956 | Breithaupt | 43/57 |
| 2,800,741 | 7/1957 | Adams | 43/55 |
| 2,885,819 | 5/1959 | Newell | 43/55 |
| 2,960,321 | 11/1960 | Stoots | 43/57 |
| 2,998,671 | 9/1961 | Hinton | 43/57 |
| 3,258,369 | 6/1966 | Blaich | 220/22 |
| 3,401,671 | 9/1968 | Axelrod | 43/55 |
| 3,499,244 | 3/1970 | Malone | 43/56 |
| 3,509,657 | 5/1970 | Bross, Jr. | 43/57 |
| 3,751,845 | 8/1973 | Van Leeuwen | 43/56 |
| 3,835,575 | 9/1974 | Kelley et al. | 43/56 |
| 4,128,170 | 5/1978 | Elliott | 43/54.1 |
| 4,168,590 | 9/1979 | Beshoner | 43/55 |
| 4,353,182 | 10/1982 | Junkas | 43/55 |
| 4,462,180 | 7/1984 | Scott | 43/57 |

Primary Examiner—Gene P. Crosby
Attorney, Agent, or Firm—Orrin M. Haugen; Thomas J. Nikolai; Frederick W. Niebuhr

[57] ABSTRACT

A portable, insulated bait container for maintaining a variety of live bait types in a plurality of bait compartments. The container includes a pivotal carrying handle and a close fitting top for mounting over each of the provided compartments. At least one of the compartments being water filled and adjacent to which a life support compartment containing a battery operated aerator is included along with circuitry for automatically at selected times aerating the contained water. Alternatively, switch means permit manual operation.

6 Claims, 3 Drawing Figures

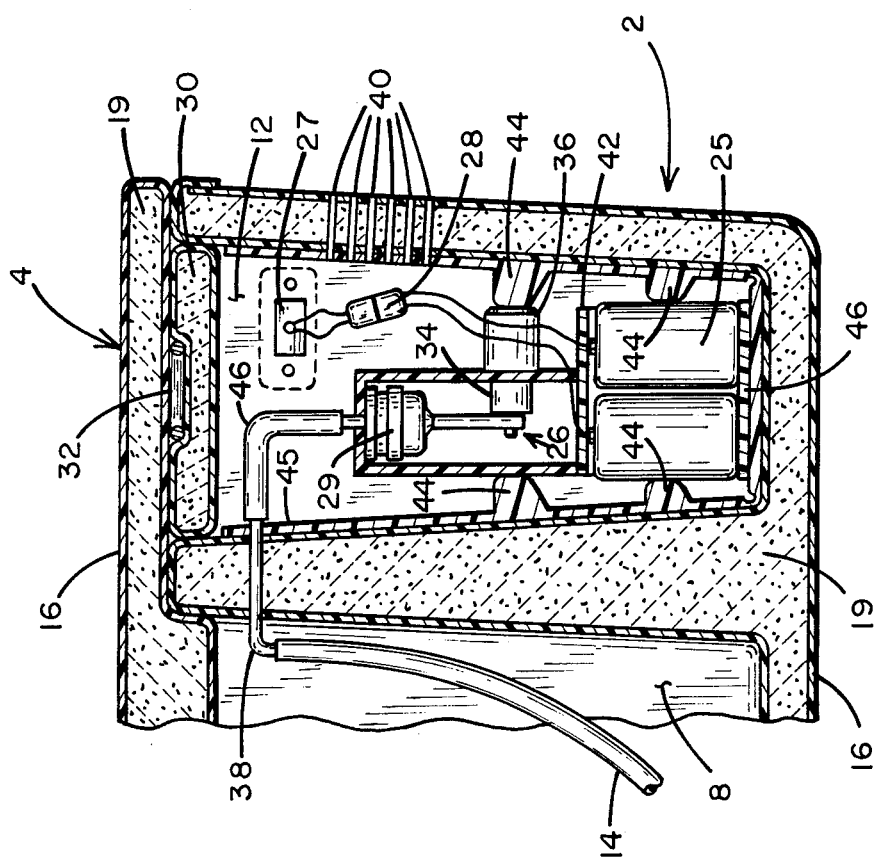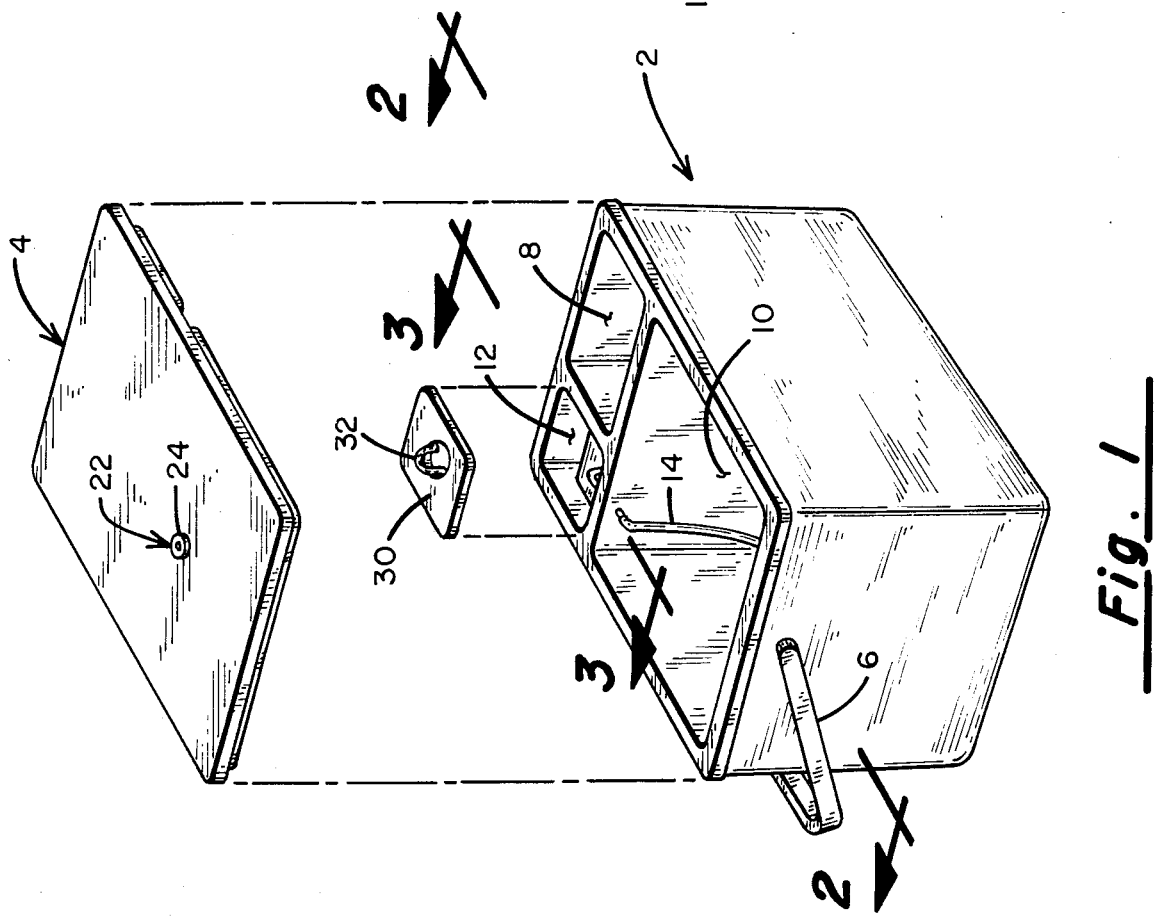

ENERGY EFFICIENT AERATED BAIT CONTAINER

BACKGROUND OF THE INVENTION

The present invention relates to live bait containers and, in particular, to a portable aerated bait container for simultaneously maintaining the life of various bait types, such as minnows, crayfish, frogs, leeches, night crawlers, grubs and the like.

Because fishing conditions and the types of fish a fisherman may attempt to catch during the course of a fishing trip can change, fisherman oftentimes carry a variety of live baits, not to mention a selection of articifial lures. However, with each different bait type, the fisherman must take various precautions to ensure the longevity of the bait for his or her entire trip or even possibly for the next trip, should the bait not be used up. With the price of live bait going up each year, the necessity of rebuying bait for each trip becomes especially disadvantageous.

Particular problems encountered by the fisherman in preserving the live bait arise from the inability of shading the bait from the sun, maintaining the bait in a cool environment and/or aerating the water for bait such as minnows and crayfish. A variety of bait containers have previously been developed, but none of which provide the advantages of the present invention.

Some examples of previously known portable bait containers can be seen upon directing attention to various U.S. patents. In particular, upon referring to U.S. Pat. No. 2,639,906, a portable bait container is disclosed similar to the conventional larger storage tank type and wherein water is pumped from the bottom of the bait container through a top mounted conduit and sprayed back into the water. Water is sprayed from the top mounted conduit as a fine spray and thus the spray and the water in the tank became air entrained or oxygenated and whereby the live bait is maintained. A second aerated system incorporating a fan for churning the storage water is described in U.S. Pat. No. 2,998,671. Yet another aerator system is described in U.S. Pat. No. 3,835,575. There, the use of a battery powered air pump is disclosed for forcing air through the storage water. Yet another aerator system is disclosed in U.S. Pat. No. 3,509,657 and wherein a motorized pump is used to circulate water past an air input tube, thus causing the oxygenation of the water.

While each of the above-mentioned patents generally operates to oxygenate the water, they provide less than ideal results in that they require significant amounts of power to operate the associated pumps, fans, etc. This power consumption becomes a particular problem for the fisherman in that either an onboard power supply is required or the size of the bait container must be increased to provide for a larger storage battery. The present invention, however, overcomes these problems by providing an energy efficient system including control circuitry for periodically aerating the water. Alternatively, the water may be aerated in a manual mode. Still further, the circuitry is adapted to permit the recharging of the self-contained storage battery. Finally, it is to be recognized that a judicious use of thermal insulation and the positioning of the various compartments permits the maintenance of each of the stored baits in a relatively cool, shaded environment.

The above objects, advantages and distinctions of the present invention, among others, not to mention the construction thereof, will become more apparent upon reference to the following description of the presently preferred embodiment relative to the appended drawings. In this regard, it should be recognized, too, that the following description is given by way of reference to the presently preferred embodiment only and which should not be interpreted in any way to be self-limiting.

SUMMARY OF THE INVENTION

An insulated self-contained, multi-compartmented bait container for storing live bait. Included within the bait container is a life support system comprising a battery operated aerator and associated control circuitry for periodically aerating the water in one of the compartments. An operator accessible switch permits the selective operation of the aerator in a manual mode or in an automatic mode and during which the aerator at predetermined times and for perdetermined periods aerates the contained water. Insulation provided between the segmented compartments in combination with the aerated water and a close fitting top maintain the bait in a cool and oxygen rich environment.

BRIEF DESCRIPTION OF THE DRAWINGS

FIG. 1 shows a perspective view of the present invention.

FIG. 3 shows a cross-sectioned view taken along section lines 3—3 of FIG. 1 through the accessory compartment.

DESCRIPTION OF THE PREFERRED EMBODIMENT

Figure 2:
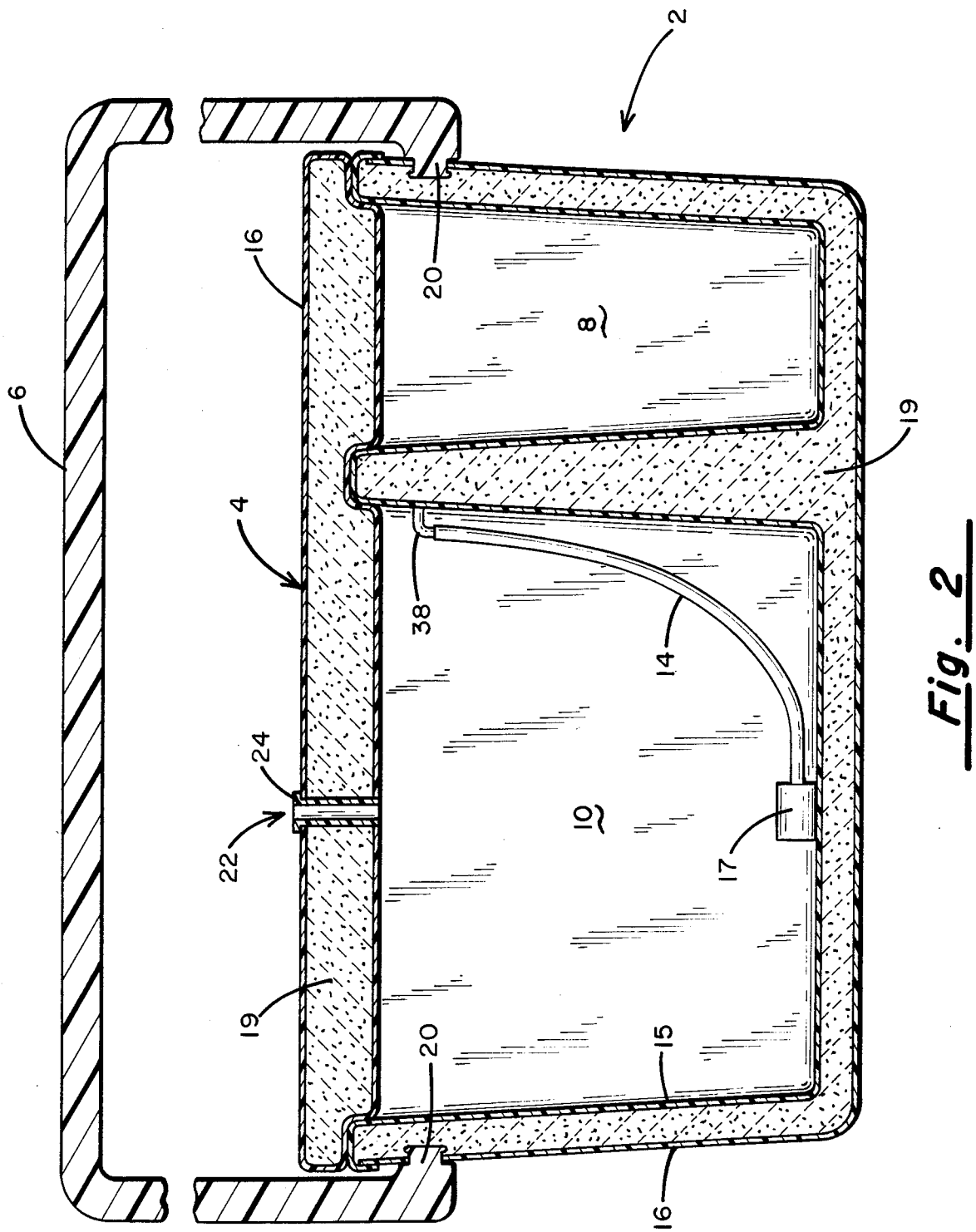
FIG. 2 shows a cross-sectioned front view taken along section lines 2—2 of FIG. 1.

Referring to FIG. 1, a perspective assembly view is shown of the present insulated bait container 2 relative to its cover member 4. Pivotally mounted to the top center of two sides of the container 2 is a carrying handle 6. With the cover 4 mounted on the container 2, the appearance thereof resembles that of a conventional ice cooler, both in size and shape. Depending, too, upon the number of bait compartments provided and the types of bait intended, the size of the container 2 may be varied accordingly.

Formed interiorly of the container 2 are a number of bait compartments and which for the embodiment of FIG. 1 comprise a dry compartment 8 and a wet compartment 10. The dry compartment 8 being intended for baits such as night crawlers, frogs or other live bait that require a dry or slightly moist environment. The wet compartment 10, in turn, is sized so as to accommodate a sufficient volume of water for containing a quantity of minnows, leeches or other live bait requiring a supply of water. For example, for a bait container 2 of a typical size of 16 inches long by 12 inches wide by 8 inches deep, the wet compartment 10 will typically be sized to be $10 \times 10 \times 8$ and will contain approximately 9 quarts of water. A compartment 10 of this size, in turn, will provide space for approximately 9 dozen minnows and will maintain a significant percentage of the minnows for periods of up to a week without requiring a water change.

Recognizing, however, that this number of minnows for the space available would use up the available oxygen in the water in a matter of hours, the present invention includes an aerator. Specifically, the present invention includes a diaphram-type aerator pump that is mounted in the auxilary compartment 12 and which is used to aerate the water of the compartment 10 so as to maintain a sufficient supply of oxygen to the water to maintain the minnows therein. As can be seen from FIG. 1, the air is supplied to the compartment 10 via the conduit 14 and an associated porous ceramic filter 17 (reference FIG. 2) mounted at the end thereof. The details of the auxilary compartment 12 and its contents will be discussed hereinafter. Mounted to the side of the compartment 12 is an operator actuable switch (not shown) for controlling the operation of the aerator pump.

From FIG. 1, it is also to be noted that the cover 4 is fabricated such that its lower surface is formed to contain a number of raised surfaces that mount securely with a friction fit over the tops of each of the compartments 8 and 10. In this fashion, the cover 4 will not become dislodged during transport or when not in use.

Directing attention now to FIG. 2, a cross-sectioned front view is shown as taken along section lines 2—2 of FIG. 1. From this view, a better understanding can be had as to the mounting relationship of the foam-filled cover 4 relative to the bait container 2. Also, it is to be noted that each of the compartments 8 and 10 of the bait container 2 are full depth and are insulated as at callout numeral 19. As presently contemplated, the bait container 2 and cover 4 would be fabricated from a suitable plastic via an appropriate molding or stamping operation to have inner and outer plastic skins 15 and 16 and which would provide a weather tight, non-rusting enclosure. At present, it is also contemplated that an injected polystyrene insulation 19 would be used.

From FIG. 2, it is also to be noted that the carrying handle 6 mounts to the sides of the container 2 in a snap-fit fashion via cap-like projections 20 formed at the ends of the cover handle 6. Upon inserting the capped ends 20 into holes formed in the container 2 sides, they are permanently pivotally secured thereto. Also, it is to be noted that a vent hole 22 is formed in the cover 4 over the minnow compartment 10 so as to permit the escape of carbon dioxide therefrom. The vent hole 22 typically being formed by inserting a nylon bushing 24 through a hole formed in the cover.

Directing attention now to FIG. 3, a detailed cross-sectional view taken along section lines 3—3 of FIG. 1 is shown relative to the accessory compartment 12. This compartment like the bait compartments 8 and 10 shown in FIG. 2 is formed as a full depth compartment and is sized to contain a suitable battery power supply 25, an aerator 26, switch 27 and circuitry 28 for controllng the aerator 26. A separate insulated cover member 30 is provided over this compartment 12 and which cover member 30 friction fits within the opening so as not to be readily removed therefrom, except by pulling on the cover ring 32 provided at the top of the cover 30.

Mounted immediately beneath the cover 30 is a diaphragm-type air pump 29 and which is driven via an eccentric lobed member 34 that operates the linkage arm coupled to the pump diaphragm via an adjacent DC motor 36, together they comprise the aerator 26. Mounted, in turn, beneath the pump 29 is a rechargeable nickel cadmium battery power pack 25.

As can be seen from FIG. 3, the outlet end of the pump 29 is coupled to a nipple member 38 via a short length of conduit 46. The nipple member 38 passes between the accessory and minnow containing compartments 12 and 10 in sealed relation so as to prevent against water from inadvertently entering the accessory compartment 12. The conduit 14 within the minnow containing compartment conveys air to the water via the filter element 17, where it is despersed through the pores of the filter 17. The air itself enters the accessory compartment 12 via appropriate vent holes 40 let into the walls thereof. For the present embodiment, the pump 26 is sized to provide a sufficient amount of oxygen to the water to keep the mentioned quantity of minnows and which pump 26 is driven at 60 cycles per minute via the lobed eccentric 34 and the DC motor 36.

The power supply 25, as mentioned, comprises a six volt nickel cadmium power source that is mounted in the bottom center of the accessory compartment 12. It is spaced away from the sidewalls thereof via a battery and aerator carrier 42 and a number of projections 44 that extend from an inner compartment liner 45. Together, the carrier 42 and liner 45 center the contents relative to the compartment walls, while a flexible support pad 46 mounted in the bottom thereof supports the assembly. The support pad 46 and projections 44 also dampen any vibrations that otherwise occur with the operation of the motor 36 and thus deaden and prevent the transmission of sound.

At this point, it should be noted, too, that in between fishing trips, the battery power supply 25 can be removed and recharged by inserting it in an appropriate recharger. Alternatively, AC/DC conversion circuitry can be mounted within the accessory compartment 12 for recharging the battery supply 25 in place. However, because of the attendant cost and space requirements of such recharging circuitry, the present embodiment contemplates recharging the battery externally of the container 2.

Mounted near the top of the compartment 12, at its back wall is the off/manual/automatic switch 27 and to which appropriate electric connections are made between the battery 25, motor 36, control circuitry 28 and pump 29. The externally mounted operator switch 27 permits either manual operation of the pump 25 for operator controlled amounts of time. Alternatively, because of the power required and even though it is relatively small for the present motor 36, the pump 29 and motor 36 can be run intermittently by placing the switch 27 in its automatic position. In order to achieve this end, the present invention includes conventional time control circuitry 28 and which upon switching the switch 27 to its automatic position causes a periodic operation of the aerator pump 26 for predetermined amounts of time at a predetermined frequency. At present, the pump runs 10 minutes each half hour and which is sufficient to maintain oxygen to approximately 9 dozen minnows. At this operating frequency, the present power supply is also sized to provide for approximately 96 hours of operation and the retention of approximately 90 percent of the live bait.

As mentioned, the switch 27 also permits manual operation and which feature may be used intermittently to provide additional oxygen for warm days. Also, it may be used in lieu of the automatic position on cold days, since less oxygen is required as the water is cooled. Furthermore, because of the insulating of the various compartments, swings in temperature are minimized. Still further, because of the insulation 19 and the size of the container 12 it can be used as a seat while ice fishing without the water freezing.

While the invention has been described with respect to its presently preferred embodiment, it is to be recognized that various modifications may be made thereto.

For example, each of the compartments might be further segmented by forming intermediate shelf projections at various levels and upon which various tray inserts might be positioned such that more than one type of bait can be stored in a single compartment. For example, night crawlers might be stored in the bottom tray and leeches in the upper tray, while minnows are stored in the minnow compartment. Alternatively, three or more compartments might be provided. Still further, the cover can be formed with drink holder recesses in the upper surface thereo. Still further, a waterproof light might be included in one or more of the bait compartments to facilitate night fishing and which lights would turn on, upon removal of the cover.

From the foregoing, it should be apparent, therefore, that various modifications can be made to the present invention without departing from the spirit and scope thereof. Accordingly, it is contemplated that the following claims should be interpreted so as to include all those equivalent embodiments within the spirit and scope thereof.

What is claimed is:

1. A live bait container comprising in combination:
   a unitary housing formed of thermally insulative material entirely covered with a water impermeable skin, said housing including a plurality of compartments formed therein, each compartment open only to the top thereof, the tops of said compartments together comprising an open top of the housing;
   a cover member for mounting over the open top of said housing;
   battery operated pump means mounted in a first one of said compartments and coupled in air flow communication with a second one of said compartments for supplying air to water contained in said second compartment and thereby aerating the water;
   a flexible pad and a plurality of projections extended into said second compartment for supporting a storage battery and the pump means in centered non-vibrating relation to said second compartment;
   means coupled to said pump means for periodically operating said pump means for predetermined amounts of time selected to provide an adequate supply of oxygen to sustain a selected amount of live bait contained in the second compartment; and
   air vent means mounted relative to said second compartment and open to the atmosphere.

2. Apparatus as set forth in claim 1 wherein said housing includes a handle mounted to opposite sides thereof, said handle on its opposed sides having first and second capped ends extending inwardly towards one another such that upon insertion into holes in said opposed sides of said housing, said first and second capped ends secure said handle pivotally to said housing.

3. Apparatus as set forth in claim 2 wherein said cover includes a plurality of raised portions extending from its lower surface, said raised portions aligned for friction fit over the tops of said compartments whereby each of said compartments is sealed from each of the other compartments.

4. Apparatus as set forth in claim 1 including a single vent hole formed in said cover member above said second compartment.

5. Apparatus as set forth in claim 1 including a second cover adapted for a friction fit against said first compartment to seal the top thereof.

6. Apparatus as set forth in claim 5 including a ring attached to said second cover for removing the second cover from said first compartment.

* * * * *